May 30, 1950  G. M. MOTIS  2,509,445
QUICK DISCONNECT ANCHOR FITTING FOR BOWDEN CABLES
Filed Aug. 4, 1947
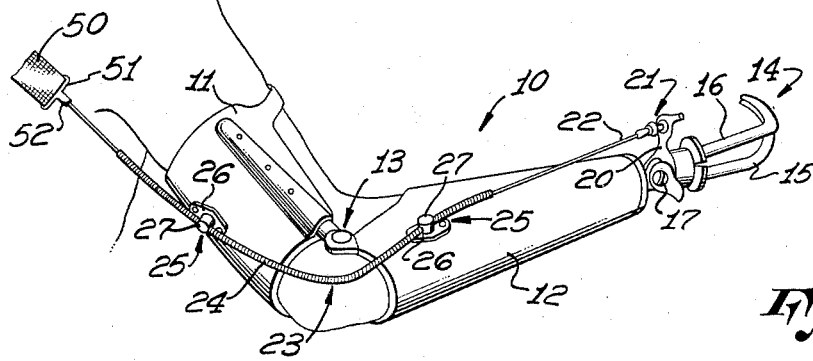
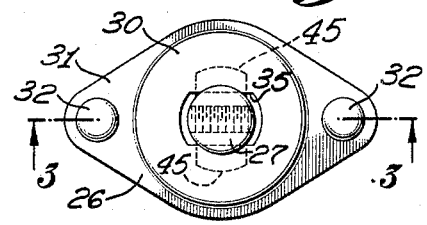
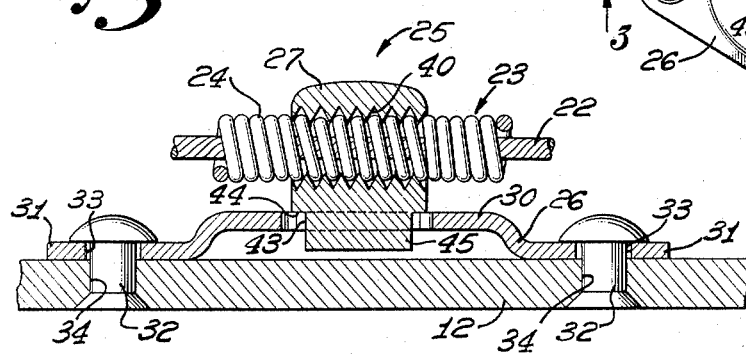
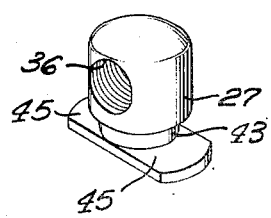
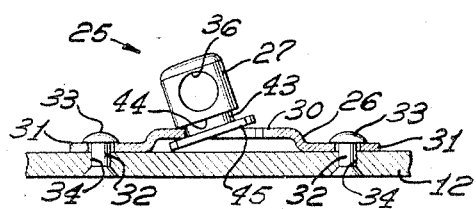
INVENTOR.
Gilbert M. Motis,
BY Forrest J. Lilly
ATTORNEY.

Patented May 30, 1950

2,509,445

UNITED STATES PATENT OFFICE 2,509,445

QUICK DISCONNECT ANCHOR FITTING FOR BOWDEN CABLES

Gilbert M. Motis, Burbank, Calif., assignor to Northrop Aircraft, Inc., Hawthorne, Calif., a corporation of California Application August 4, 1947, Serial No. 765,993

5 Claims. (Cl. 248—51)

The present invention relates to anchor fittings for attaching the flexible conduit or sheath of a Bowden cable to a supporting member, and is primarily adapted for use in attaching the ends of a Bowden cable sheath to two relatively movable parts of an artificial limb.

In the case of upper extremity prostheses, it is customary to transmit the control force for operating a hook from the shoulder harness down to the actuating lever of the hook through a Bowden cable, which is flexible and can be bent at the elbow without adverse effect on the operation of the hook. One essential consideration in the use of Bowden cables is that the outer flexible conduit be anchored to each of the two relatively movable members with which it is associated, so that the effective length of the conduit between the points of anchorage remains fixed and constant, irrespective of the angular relationship between the members, or of tension in the inner wire. It is also desirable that the anchor fitting be free to swivel to a certain extent, so as to enable the Bowden cable to accommodate itself in smooth curves to any angular relationship between the supporting members, or to any forces tending to bend the cable at its point of attachment.

In addition to the above general considerations, there are other problems which are more or less specific to the requirements of artificial limbs. One of these is that the anchor fittings should be quickly and easily removable from the supporting members and without tools, without the necessity of removing rivets, or unsoldering the ball fittings at the end of the cable wire, so that the amputee is enabled to replace worn or unserviceable cable controls. Another requirement is that the anchor fittings be quickly and easily adjustable to any position along the length of the flexible conduit, to enable the amputee to fit the Bowden cable to his specific needs. This is an important feature, when it is realized that no two prostheses are identical, and that correct fit and installation of the controls is essential to proper operation of the device.

With the foregoing in mind, it is one of the primary objects of the present invention to provide a new and improved anchor fitting for attaching the flexible conduit of a Bowden cable to the upper and lower arm portions of an artificial arm.

Another object of the invention is to provide a quick-detachable anchor fitting comprising a base member that is permanently attached to the supporting arm structure, and a retainer that is secured on the flexible conduit, said retainer having an elongated, laterally extending flange which is adapted to be inserted through a slot in the base member and then turned 90 degrees, so that the flange is confined under the base member and is held thereby.

Another object is to provide a quick-detachable anchor fitting which is swiveled on its supporting member, so that the flexible conduit is permitted to accommodate itself in smooth curves to any angular position of the upper and lower arm members.

Another object is to provide an anchor fitting which is compact and smoothly rounded on all of its exposed surfaces, so as to reduce excessive wear on the clothing.

Still a further object of the invention is to provide an anchor fitting which is inexpensive and simple to manufacture.

The foregoing and other objects and advantages of the present invention will become apparent to those skilled in the art upon consideration of the following detailed description of the preferred embodiment thereof, reference being had to the accompanying drawings, in which:

Figure 1 is a perspective view of an artificial arm, showing a Bowden cable control attached to the upper and lower arm portions by anchor fittings embodying the principles of the invention;

Figure 2 is an enlarged top plan view of the anchor fittings;

Figure 3 is a still further enlarged sectional view taken along the line 3—3 in Figure 2;

Figure 4 is a perspective view of the retainer; and

Figure 5 is a sectional view similar to Figure 3, showing the manner in which the retainer is inserted through the slot in the base member.

In the drawings, the reference numeral 10 designates an artificial arm comprising an upper arm section 11 and a lower arm section 12, both of which are preferably formed of laminated, plastic-impregnated fabric that has been molded on suitable forms and oven-cured. The upper and the lower sections 11, 12 are connected together by a suitable elbow joint 13, and mounted on the outer end of the lower arm section 12 is a utility hook 14 comprising a stationary hook 15 and movable hook 16. The movable hook 16 is pivoted at 17 and is adapted to be opened and closed with respect to the stationary hook 15, so that objects may be grasped between them. Projecting upwardly from the pivot end of the movable hook 16 is an actuating lever 20, the outer end of which is provided with a socket to receive a ball-coupling attached to the end of a flexible control wire 22.

The control wire 22 is the tension-transmitting, inner wire of a Bowden cable 23, which also includes a flexible conduit or sheath 24 enclosing the wire 22 for a portion of the latter's length. The conduit 24 is in the nature of a tighty wound spring, and is preferably formed of stainless steel wire, the coils of which are normally closed tightly together, so that a considerable amount of tension is required to separate them appreciably. Because of this arrangement, the spring is virtually incompressible, yet at the same time flexible, and the conduit 24 thus provides a path of constant length to which the wire 22 is confined.

The conduit 24 is attached to both the upper arm section 11 and the lower arm section 12 by means of quick-detachable, swiveled anchor fittings 25, which will now be described. Each of the fittings 25 comprises a base member 26 that is fixed to its respective arm section, and a retainer 27 that is secured on the conduit 24. The base member 26 is preferably in the form of a sheet metal stamping of corrosion resistant steel, and is formed with a raised, flat circular crown 30 having mounting flanges 31 at opposite sides thereof. The base member 26 is curved on its under side to fit against the arm section, and is secured to the latter by rivets 32 which pass through holes 33 and 34 in the flanges 31 and arm section, respectively. Formed in the center of the crown 30 is an elongated slot 35 having parallel, straight sides and arcuate ends, the axis of the slot 35 preferably lying on a line drawn through the centers of the rivet holes 33.

The retainer 27 is a generally cylindrical member, preferably made of brass, having a transversely extending hole 36 formed therein which is tapped to provide threads 40. The pitch of the threads 40 is slightly greater than the pitch of the coils in the conduit 24, so that when the latter is threaded through the holes 36, the coils are spread slightly and the spring tension of the wire causes the coils to bind in the threads 40. This binding action produces an appreciable resistance to relative turning movement between the conduit 24 and the retainer 27, so that the conduit is prevented from working through the retainer, but is not sufficient to prevent the retainer from being led onto the conduit with the fingers. Once the retainer has been screwed far enough along the conduit to permit grasping the end of the latter, the conduit can be stretched out slightly so that all of the coils are pulled apart to the same pitch as the threads 40, and the retainer can then be turned freely along the conduit to the desired location thereon. Releasing the tension on the conduit causes the coils to close up again, binding the threads 40 and locking the retainer in position.

The retainer 27 is undercut adjacent its lower end to form a square cut groove 43 which is somewhat smaller in diameter than the upper cylindrical body portion, leaving a downwardly facing shoulder 44. Projecting laterally from the bottom end of the retainer at right angles to the axis of the threaded hole 36 are flanges 45. The flanges 45 are of the same width as the diameter of the groove 43, being slightly narrower and somewhat longer than the slot 35, so that they can be inserted downwardly through the slot when inserted into the latter at an angle, one end first, as shown in Figure 5. Being longer than the slot 35, the flanges 45 will not drop out if they should turn, in use, to a position parallel to the slots, although they can be removed easily by merely moving the retainer to one end of the slot, and then lifting the other flange end out, in the reverse to the procedure for insertion.

When both of the flanges 45 have been inserted into the space between the crown 30 and the supporting arm sections, the retainer 27 is turned 90°, placing the flanges 45 at right angles to the slot 35, and the axis of the threaded hole 36 parallel to the axis of the slot. In this position, the crown 30 along the straight side margins of the slot 35 is loosely confined between the flanges 45 and the shoulder 44. The retainer 27 is thus free to swivel with respect to the base member and is securely held thereto.

The upper end of the wire 22 is attached to the usual shoulder harness, one strap of which is shown at 50 in Figure 1. Connection is made by a hanger 51, through which the strap 50 is inserted, and the shank of the hanger is secured to the end of the wire 22 by means of a clamp 52.

Replacement Bowden cables are supplied as assemblies, with hanger 51 and ball fitting 21 attached to the wire 22, and with two retainers 25 screwed onto the conduit 24. When a Bowden cable control becomes unserviceable, it is removed by detaching the strap 50 from the hanger 51, disconnecting the ball coupling 21 from the operating lever 20 of the hook, and removing the two retainers 27 from their respective base members 26, as described earlier. The retainers of the new cable assembly are then turned along the conduit 24 to the same positions as in the old cable, and inserted into the base members 26, after which the ball coupling 21 is connected to the operating lever 20, and strap 50 is secured to the hanger 51.

While I have shown and described above in considerable detail what I believe to be the preferred form of my invention, it will be understood that various changes may be made in the shape and arrangement of the several parts without departing from the broad scope of the invention, as defined in the appended claims.

I claim:

1. An anchor fitting for attaching the flexible conduit of a Bowden cable to a supporting member, said fitting including a sheet metal base member fixed to said supporting member, said base member having a portion raised up from said supporting member, with an elongated slot formed therein, a retainer having a transversely extending hole provided therein to receive said conduit, a pair of oppositely extending flanges projecting from the bottom end of said retainer at right angles to said hole, said flanges being adapted to be inserted through said slot and turned 90 degrees with respect thereto, said raised portion of said base member having an interior surface extending in arcuate paths substantially continuously and uninterruptedly between opposite ends of said slot to provide for free and unimpeded relative rotary travel of said flanges thereon, said flanges being confined between said raised portion and said supporting member, whereby said retainer is secured to said base member, yet free to swivel.

2. An anchor fitting for attaching the flexible conduit of a Bowden cable to a supporting member, said fitting including a sheet metal base member fixed to said supporting member, said base member having a portion raised up from said supporting member, with an elongated slot formed therein, a retainer secured to said conduit and having a pair of oppositely extending flanges projecting from the bottom end thereof, said flanges being slightly narrower and somewhat longer than said slot, whereby they can only be inserted through the latter at an angle, one end first, said flanges being turned after insertion through said slot so that they are confined between said raised portion and said supporting member, whereby said retainer is secured to said base member, yet free to swivel.

3. An anchor fitting for attaching the spirally wound flexible conduit of a Bowden cable to a supporting member, said fitting including a sheet metal base member formed with a raised, flat, circular crown portion having mounting flanges at opposite ends thereof for attachment to said supporting member, said crown portion having an elongated slot formed in the center thereof, a retainer having a transversely extending threaded hole provided therein, said spirally wound conduit being threaded into said hole, a pair of oppositely extending flanges projecting laterally from the bottom end of said retainer, said flanges being slightly narrower and somewhat longer than said slot, whereby they can only be inserted through the latter at an angle, one end first, said flanges being turned after insertion through said slot so that they are confined between said raised crown portion and said supporting member, whereby said retainer is secured to said base member, yet free to swivel.

4. An anchor fitting for attaching the spirally wound flexible conduit of a Bowden cable to a supporting member, said fitting including a sheet metal base member formed with a raised, flat, circular crown portion having mounting flanges at opposite ends thereof for attachment to said supporting member, said crown portion having an elongated slot formed in the center thereof and extending generally parallel to the course of said cable, a retainer having a cylindrical body with a transversely extending threaded hole provided therein, said spirally wound conduit being threaded into said hole, a pair of oppositely extending flanges projecting laterally from the bottom end of said retainer at right angles to said hole, said flanges being slightly narrower and somewhat longer than said slot, whereby they can only be inserted through the latter at and angle, one end first, said retainer having an annular groove of the same diameter as the width of said flanges formed therein directly above the flanges, said flanges being turned 90 degrees to said slot after insertion through the latter so that they are confined between said raised crown and said supporting member, with said crown portion adjacent the side edges of said slot being disposed within said groove, whereby said retainer is secured to said base member, yet free to swivel.

5. An anchor fitting for attaching the spirally wound flexible conduit of a Bowden cable to a supporting member, said fitting including a base member having an elongated slot formed therein, a retainer having a transversely extending threaded hole provided therein, said spirally wound conduit being threaded into said hole, a pair of oppositely extending flanges projecting laterally from the bottom end of said retainer, said flanges being slightly narrower and somewhat longer than said slot, whereby they can only be inserted through the latter at an angle, one end first, said flanges being turned after insertion through said slot so that they are confined beneath said base member, whereby said retainer is secured to the base member, yet free to swivel.

GILBERT M. MOTIS.

REFERENCES CITED

The following references are of record in the file of this patent:

UNITED STATES PATENTS

| Number | Name | Date |
| --- | --- | --- |
| 1,637,047 | Moore | July 26, 1927 |
| 1,739,829 | Fedderman | Dec. 17, 1929 |